(12) United States Patent
Rodney

(10) Patent No.: US 8,170,851 B2
(45) Date of Patent: *May 1, 2012

(54) METHOD AND APPARATUS FOR SURVEYING A BOREHOLE WITH A ROTATING SENSOR PACKAGE

(75) Inventor: Paul F. Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/628,682

(22) Filed: Dec. 1, 2009

(65) Prior Publication Data

US 2010/0250207 A1    Sep. 30, 2010

Related U.S. Application Data

(63) Continuation of application No. 10/989,179, filed on Nov. 15, 2004, now Pat. No. 7,650,269.

(51) Int. Cl.
*G06G 7/48* (2006.01)
(52) U.S. Cl. ............................................. 703/10
(58) Field of Classification Search ....... 703/10
See application file for complete search history.

(56) References Cited

U.S. PATENT DOCUMENTS

| | | | |
|---|---|---|---|
| 4,472,884 A | 9/1984 | Engebretson | |
| 4,545,242 A | 10/1985 | Chan | |
| 4,682,421 A | 7/1987 | Van Dongen et al. | |
| 4,813,274 A | 3/1989 | Di Persio et al. | |
| 4,894,923 A | 1/1990 | Cobern et al. | |
| 5,012,412 A | 4/1991 | Helm | |
| 5,128,867 A | 7/1992 | Helm | |
| 5,321,893 A | 6/1994 | Engebretson | |
| 5,602,541 A | 2/1997 | Comeau et al. | |
| 5,806,194 A | 9/1998 | Rodney et al. | |

(Continued)

FOREIGN PATENT DOCUMENTS

GB    2369685 A    6/2002

(Continued)

OTHER PUBLICATIONS

"U.S. Appl. No. 10/989,179 Notice of Allowance Mailed Oct. 1, 2009", 7.

(Continued)

*Primary Examiner* — Hugh Jones
(74) *Attorney, Agent, or Firm* — Schwegman, Lundberg & Woessner, P.A.

(57) ABSTRACT

A method and apparatus for surveying a borehole using a rotating sensor package. A sensor tool preferably including a magnetometer sensor array is disposed in the bottom hole assembly of a drillstring. Conditioning circuitry in the sensor tool processes the sensor readings from the sensor array taken while the drillstring is rotating. In one embodiment, the conditioning circuitry includes processing circuitry adapted to adjust the sensor readings to account for an analytically predicted level of axial current induced in the drillstring as a result of its rotation in the Earth's magnetic field. In another embodiment, a current generator is provided to generate a counter-current intended to cancel the analytically predicted level of axial current induced in the drillstring as a result of rotation in the Earth's magnetic field. In another embodiment, insulating members are disposed above and/or below the sensor tool to prevent conduction of rotation-induced current therein. In still another embodiment, the sensor tool is disposed in a drill collar that is composed of a non-conducting material, such that no rotation-induced current is conducted through the sensor tool.

14 Claims, 4 Drawing Sheets

U.S. PATENT DOCUMENTS

| | | |
|---|---|---|
| 5,960,370 A | 9/1999 | Towle et al. |
| 6,237,404 B1 | 5/2001 | Crary et al. |
| 2006/0106587 A1 | 5/2006 | Rodney |

FOREIGN PATENT DOCUMENTS

| | | |
|---|---|---|
| GB | 2370361 A | 6/2002 |
| WO | WO-9416196 A1 | 7/1994 |
| WO | WO-03004826 A1 | 1/2003 |

OTHER PUBLICATIONS

"U.S. Appl. No. 10/989,179, Response filed Dec. 15, 2008 to Non Final Office Action maield Sep. 18, 2008", 16 pgs.

"U.S. Appl. No. 10/989,179, Final Office Action mailed Mar. 17, 2009", 16 pgs.

"U.S. Appl. No. 10/989,179, Non-Final Office Action mailed Sep. 18, 2008.", 15 pgs.

Welch, Greg, et al., "An Introduction to the Kalman Filter", *TR 95-041, Department of Computer Science*, University of North Carolina at Chapel Hill, and Gary Bishop, (Apr. 5, 2004).

METHOD AND APPARATUS FOR SURVEYING A BOREHOLE WITH A ROTATING SENSOR PACKAGE

RELATED APPLICATION

This application is a continuation of U.S. patent application Ser. No. 10/989,179, filed Nov. 15, 2004, which is incorporated herein by reference.

FIELD OF THE INVENTION

This invention relates generally to the field of hydrocarbon exploration and production, and more particularly relates to the surveying of boreholes.

BACKGROUND OF THE INVENTION

There is a growing need within the industry for higher precision borehole surveys and for more frequent survey data. This is driven by several factors:

First, those of ordinary skill in the art will appreciate that there are the obvious increased financial benefits from optimal positioning of well bores within targets. Higher precision surveys also reduce the difficulty in reaching smaller targets. Further, there has been a recognized need for a more detailed understanding of the local structures of boreholes to control drag and to monitor deviation tendencies.

Geological steering (also known as geosteering) relies on prior well information and/or seismic information in addition to the geometric coordinates of the well being drilled. Since it takes on the order of a thousand feet to optimally position a well bore in a formation, geological markers, some well above the target zone, are typically used as reference points for programmed changes in the borehole trajectory. Any geometric error in the location of these points, such as errors caused by surveying inaccuracies, must be interpreted either as a change in geology or as a pure error. There is no known way to make a distinction between these alternatives. Hence, even though geosteering is used, geometric survey errors can cause a trajectory to completely miss the proposed target, or to be suboptimally located within that target. Positioning accuracy can be improved by taking more frequent surveys.

Historically, the conventional approach for borehole surveying was to take certain borehole parameter readings or surveys only when the drillstring was not rotating. While there were several reasons for taking measurement-while-drilling (MWD) measurements only in the absence of drillstring rotation, a principal reason for doing so was that the sensor arrays commonly used for measurement of the drillstring's azimuth and inclination (e.g., triaxial accelerometer and magnetometer sensor arrays) yielded the most reliable sensor outputs only when the drill string was stationary.

Some time ago, however, it came to be recognized that it is desirable in many circumstances to be able to measure azimuth and inclination while the drillstring is rotating. Examples of such circumstances include where drilling is particularly difficult and interruption of the rotation could increase drillstring sticking problems, or where knowledge of instantaneous bit walk information is desired in order to know and predict the real-time path of the borehole.

Those of ordinary skill will recognize that the prior art is replete with proposed systems and methods for obtaining azimuth and inclination measurements for the purposes of directional drilling. An early example is U.S. Pat. No. 4,733,733 to Bradley, titled "Method of Controlling the Direction of a Drill Bit in a Borehole," which proposes utilizing a near-bit mechanics sensor and position monitor sensor to measure the magnitude of bending moments on the drill string.

It is more common, however, to utilize magnetometer and accelerometer sensor arrays disposed in a downhole segment of a drillstring to measure azimuth and inclination of a borehole. See, for example, U.S. Pat. No. 4,472,884 to Engebretson, titled "Borehole Azimuth Determination Using Magnetic Field Sensor." See also, U.S. Pat. No. 4,813,274 to DiPersio et al., titled "Method for Measurement of Azimuth of a Borehole While Drilling;" U.S. Pat. No. 4,894,923 to Cobern et al., titled "Method and Apparatus for Measurement of Azimuth of a Borehole While Drilling;" U.S. Pat. No. 5,012,412 to Helm, titled "Method and Apparatus for Measurement of Azimuth of a Borehole While Drilling;" U.S. Pat. No. 5,128,867 to Helm, titled "Method and Apparatus for Determining Inclination Angle of a Borehole While Drilling;" U.S. Pat. No. 5,602,541 to Comeau et al., titled "System for Drilling Deviated Boreholes;" U.S. Pat. No. 6,405,808 to Edwards et al., titled "Method for Increasing the Efficiency of Drilling a Wellbore, Improving the Accuracy of its Borehole Trajectory and Reducing the Corresponding Computed [Ellipse] of Uncertainty;" U.S. Pat. No. 6,438,495 to Chau et al., titled "Method for Predicting the Directional Tendency of a Drilling Assembly in Real-Time;" U.S. Pat. No. Re. 35,790 to Psutanyk et al., titled "System for Drilling Deviated Boreholes;" U.K. Patent No. 2,369,685, titled "Method of Determining Trajectory in Borehole Drilling;" and U.K. Patent No. 2,370,361, titled "Borehole Survey Method and Apparatus.

Of course, in any drilling system utilizing magnetometer- and accelerometer-based sensor arrays to measure and control the trajectory of the drillstring, optimal reliable performance of such systems is necessarily dependent upon the accuracy of the sensor data that is provided from the downhole sensors. Accordingly, it is generally understood that steps should preferably be taken to address the various factors that can adversely impact the accuracy or precision of the sensor data. Numerous such factors have been recognized in the prior art, and numerous approaches for addressing such factors have been proposed in the prior art.

For example, U.S. Pat. No. 5,806,194 to Rodney et al. proposes a method of correcting for the distorting effect of cross-axial magnetic interference on the readings of a well survey tool. Rodney et al. propose taking certain measurements of gravitational and cross axis magnetic fields at two or more axial locations in a well bore and using these readings to statistically estimate the cross-axis interference. The Rodney et al. '194 patent is commonly assigned to the assignee of the present invention, and is hereby incorporated by reference herein in its entirety.

Numerous other teachings relating to accounting for certain types of error in survey tool magnetometer and accelerometer sensor readings are known in the prior art. See, e.g., U.S. Pat. No. 6,021,577 to Shiells et al., entitled "Borehole Surveying;" and U.S. Pat. No. 6,470,275 to Dubinsky, entitled "Adaptive Filtering with Reference Accelerometer for Cancellation of Tool-Mode Signals in MWD Applications."

U.S. Pat. No. 5,321,893 to Engebretson proposes a technique intended to correct for fixed or induced magnetic fields in segments of a drillstring. According to Engebretson, a drillstring has an anomalous magnetization composed of both a fixed component resulting from permanently magnetized elements in the bottom hole assembly ("BHA") and an "induced" component resulting from the interaction of soft magnetic materials with the Earth's magnetic field. Engebretson seeks to model the along-axis component and compensate for this error in computation of azimuthal direction independent of inclination and direction.

Those of ordinary skill in the art will appreciate that in addition to this interaction of magnetic materials in the BHA with the Earth's magnetic field giving rise to an "induced" magnetic field in the drillstring, there is another, separate electromagnetic mechanism by which a magnetic field may be "induced" in a drillstring. In particular, according to Faraday's Law, when a drillstring rotates in the Earth's magnetic field, electrical currents are induced along the drillstring. The conduction of these induced currents along the drillstring, in turn, generates a magnetic field orthogonal to the drillstring, which interferes with the measurement of Earth's magnetic field. Such a magnetic field resulting from induced currents in a drillstring is to be specifically distinguished from the excess component of magnetic field that appears in a permeable material when it is immersed in an ambient field, despite the fact that both magnetic fields are sometimes referred to as "induced" fields. For clarity, the former induced magnetic field shall be referred to herein as a "rotation-induced magnetic field" and the latter an "ambient-induced magnetic field." These two types of "induced" fields are quite different, and techniques for modeling and/or compensating for one would not be effective to do so for the other. For example, it is believed that the techniques proposed in the above-referenced Engebretson '893 patent would not be completely effective, and perhaps may be completely ineffective, in compensating for rotation-induced magnetic fields.

A simple one-dimensional analysis of the problem of rotation-induced magnetic fields arising due to induced currents in a rotating drillstring reveals that the interfering magnetic field will tend to screen out the cross-axial components of the Earth's magnetic field and rotate the cross-axial field as observed in the reference frame of the drillstring. Empirical analysis has shown that this can result in serious survey errors; hence, drillers oftentimes are forced to interrupt the rotation of the drillstring in order to obtain accurate borehole survey data. Drillers may, in fact, be unaware of the phenomenon of rotation-induced current induction, but may nevertheless stop rotation of the drillstring to stabilize the survey instruments and obtain the most accurate measurement possible. If means were known to eliminate the effects of vibration on inclinometers and magnetometers, it would still be necessary to stop rotation when making measurements due to rotation-induced currents during rotation.

SUMMARY OF THE INVENTION

In view of the foregoing considerations, the present invention is directed to systems and methods for surveying a borehole with a rotating sensor package which take into account the presence of rotation-induced magnetic fields in a drillstring.

Broadly speaking, the present invention relates to several alternative but not necessarily mutually exclusive approaches for conducting borehole surveys with a rotating sensor package which take into account the potential for rotation-induced magnetic fields.

In one approach, steps are taken to prevent the electrical currents from being generated due to rotation of the drill string in the Earth's magnetic field. This can be accomplished in various ways. In one embodiment, electrically insulated drillstring joints on either side of the survey tool are provided to eliminate the current path for induced currents. Through elimination of the induced current, there will consequently be no rotation-induced magnetic field to contend with, even while the drillstring is rotating.

In another approach, calibration and analytical modeling are utilized to estimate the rotation-induced magnetic interference. The estimate may then be accounted for in subsequent analysis of sensor data.

In still another approach, a current source is provided to generate a counter-current to cancel the estimated rotation-induced current. Alternatively, the actual rotation-induced current in the drillstring is measured, and the current source responds by generating the canceling counter-current.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION OF SPECIFIC EMBODIMENTS OF THE INVENTION

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering and programming practices for the environment in question. It will be appreciated that such a development effort might be complex and time-consuming, but would nevertheless be a routine undertaking for those of ordinary skill in the relevant fields.

Furthermore, for the purposes of the present disclosure, the terms "comprise" and "comprising" shall be interpreted in an inclusive, non-limiting sense, recognizing that an element or method step said to "comprise" one or more specific components may include additional components.

Figure 1:
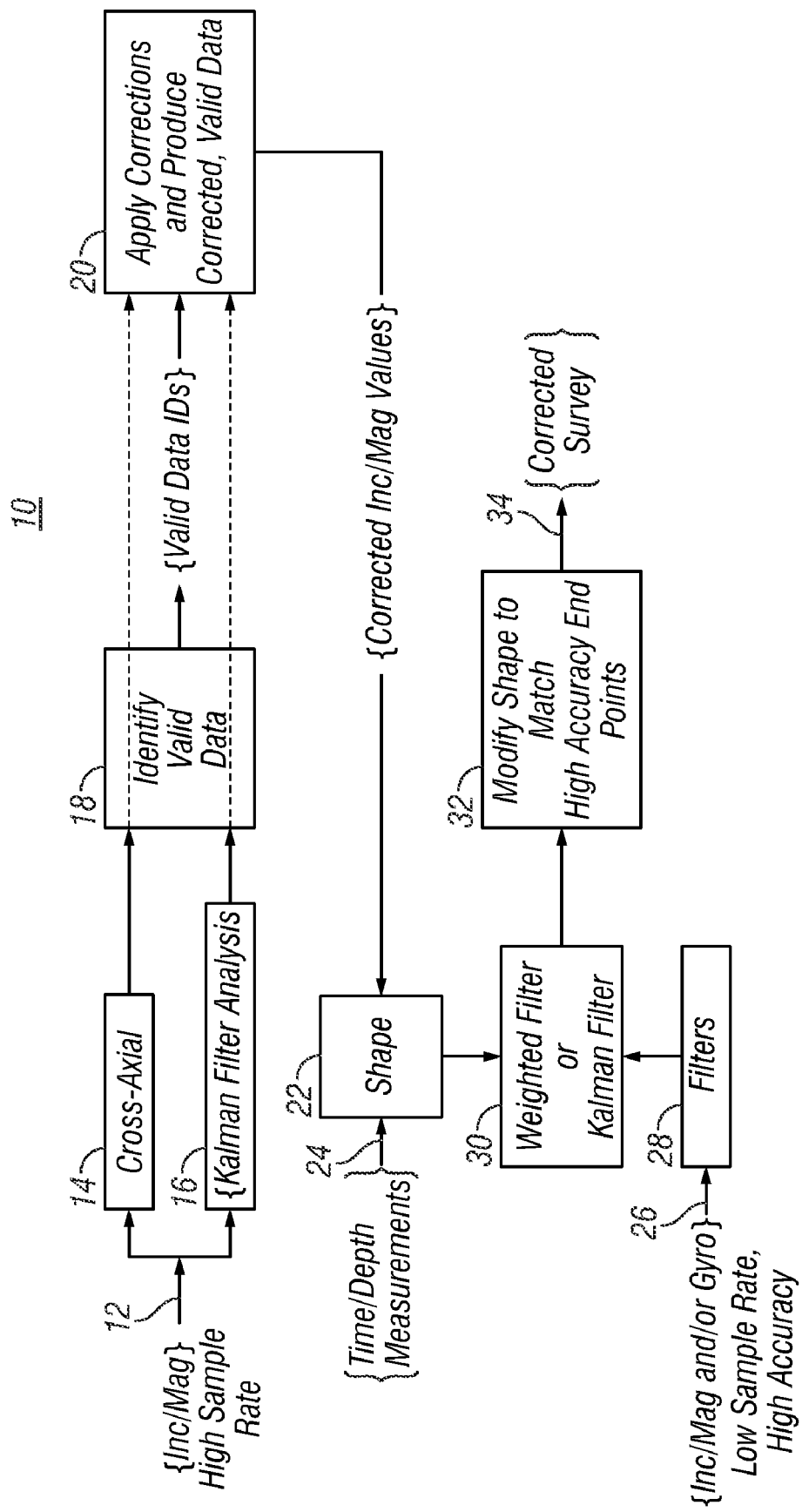
FIG. 1 is a functional block diagram of a surveying-while-rotating system in accordance with one embodiment of the invention.

Referring to FIG. 1, there is shown a functional block diagram of a surveying-while-rotating system 10 in accordance with one embodiment of the invention. The system 10 consists of a first set of inclinometers and magnetometers, that are sampled at a relatively high data rate, for example, on the order of one hundred samples per second. In accordance with one aspect of the invention, this high sample rate data, also referred to herein as rotating sensor data, is generated continuously, while the drillstring is rotating. This rotating sensor data is provided as input to system 10 as indicated at reference numeral 12 in FIG. 1. The rotating sensor input data 12 is first subjected to conventional conditioning processes, such as bias corrections, scale factor corrections, and/or cross-axial survey correction as represented by block 14 and Kalman Filter analysis as represented by block 16. Various methodologies for and implementations of cross-axial correction and Kalman filters are well known in the art, and processes are commonly used in the field to estimate and account for process and measurement noise in discrete data streams. The data is then subjected to further processing at block 18 to identify valid data (i.e., to cull out known invalid data points).

Once valid data has been identified, various corrections can be applied, as represented by block 20, using data processing techniques well known to those of ordinary skill in the art. As discussed in further detail below, the corrections and adjustments made in block 20 can include compensation for rotation-induced current in the drillstring.

The corrected data steam is then used to determine the overall shape of the borehole, i.e., the trajectory, as represented by block 22, which receives the processed data from block 20 as well as time and depth measurements 24 made at the surface as the downhole data is collected. In the preferred embodiment, and in accordance with conventional practice, the shape of the borehole is defined in terms of a mathematical model of the borehole trajectory.

System 10 further includes a set of inclinometers and magnetometers, and optionally one or more gyroscopic sensors, that are sampled at a relatively lower rate, for example, on the order of once every five minutes. In accordance with one aspect of the invention, whereas the sensors which provide the high sample rate data 12 are sampled while the drillstring is rotating, the sensors providing the low sample rate data (which may be the same sensors which provide the high sample rate data 12), shown at reference numeral 26 in FIG. 1, are sampled while the drillstring is stationary. This results in the low sample rate data 26, also referred to herein as stationary sensor data, tending to be of higher accuracy relative to the rotating sensor data 12.

Although system 10 can be implemented using a single magnetometer which responds to the gravitational field component orthogonal to the drillstring axis and a single accelerometer which responds to the gravitational field component along the drillstring axis, it is believed that better performance can be expected from a system having three mutually orthogonal magnetometers and three mutually orthogonal accelerometers, as is well-known in the art.

As previously described, when the drillstring is rotating, the high sample rate inclinometer/magnetometer sensor package produces the rotating sensor data stream 12. The large volume of data makes it possible to assemble rotational "check shots" in real time, thus making it possible to estimate cross-axial magnetometer biases and interferences in real time, such as by applying the teachings of the above-referenced U.S. Pat. No. 5,806,194 to Rodney et al.

Periodically, drillstring rotation is halted to acquire the low sample rate data 26, also referred to herein as a stationary sensor data. Low sample rate (stationary) data 26 is filtered using conventional techniques, as represented by block 28. The filtered low sample rate data is further subjected to weighted filtering and/or Kalman filtering, as represented by block 30, and is combined with the mathematical model of the borehole trajectory from block 22. As noted previously, since the low sample rate data 26 is obtained when the drillstring is stationary, it can be expected to be more accurate than the high sample rate data obtained while the drillstring is rotating.

Next, at block 32, the mathematical model defining the overall trajectory of the borehole is refined and adjusted based on the higher-accuracy stationary sensor data, to produce a "corrected" survey data, which itself preferably comprises a refined mathematical model of the borehole trajectory.

U.S. Pat. No. 6,021,577 describes a borehole surveying technique referred to as "interpolated in-field referencing" or "IIFR," which involves determining the orientation of a borehole based on downhole magnetic field measurements and time-varying geomagnetic field data indicative of variations in the geomagnetic field over time. If IIFR is used in conjunction with the present invention, it is also possible to make estimates of scale factor errors and certain misalignment errors. These estimates can be used to develop statistical models for the errors in the data. The statistical models can, in turn, be incorporated into a filtering process, such as a Kalman filter, to provide optimal estimates of tool calibration parameters and certain types of noise. These can be used in block 20 in FIG. 1 to optimally adjust the sensor data. In addition, the techniques of the aforementioned U.S. Pat. No. 5,806,194 can be applied in block 20. The corrected data 34 can then be used to calculate nearly continuous surveys along the wellbore trajectory, providing trajectory details which are not available when surveys are only taken when the survey instruments are stationary.

Figure 2:
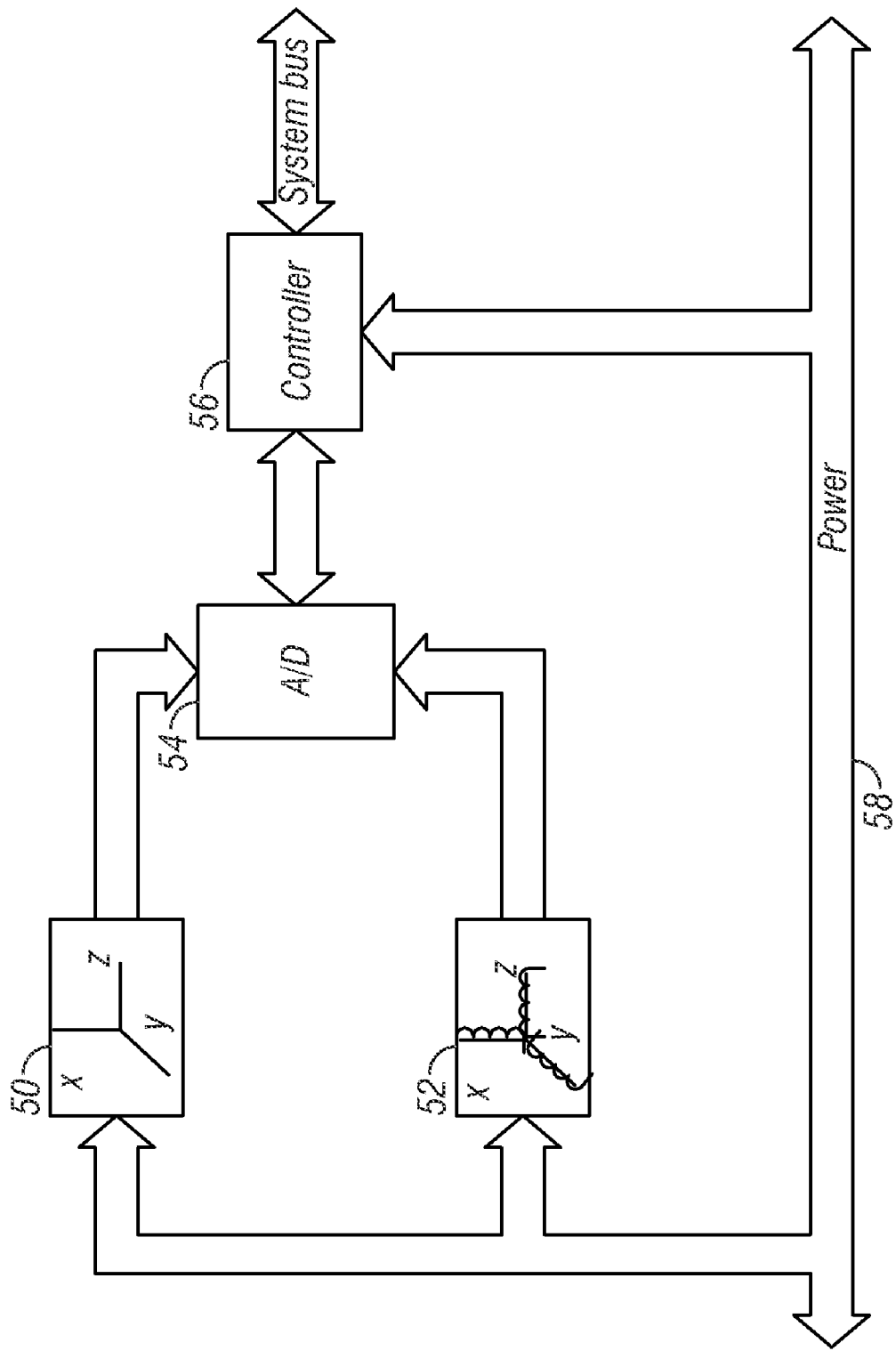
FIG. 2 is a functional block diagram of the downhole hardware used in the system of FIG. 1 to control the operation of sensors therein.

FIG. 2 shows a somewhat more detailed diagram of the portion of the downhole hardware that controls the operation of the inclinometers and magnetometers. It is to be understood that if different sensors are used for the high sample rate data channel from those for the low sample rate data, a similar structure to that shown in FIG. 2 would be provided for the additional sensors.

As shown in FIG. 2, the sensors in the preferred embodiment include a tri-axis accelerometer array 50 and a tri-axis magnetometer array 52. The respective outputs from arrays 50 and 52 are applied to an analog-to-digital (A/D) converter 54. The digital output from A/D converter 54 is then supplied to a controller 56. Power is supplied to arrays 50 and 52 and controller 56 via a power bus 58 in accordance with conventional practices.

Figure 3:
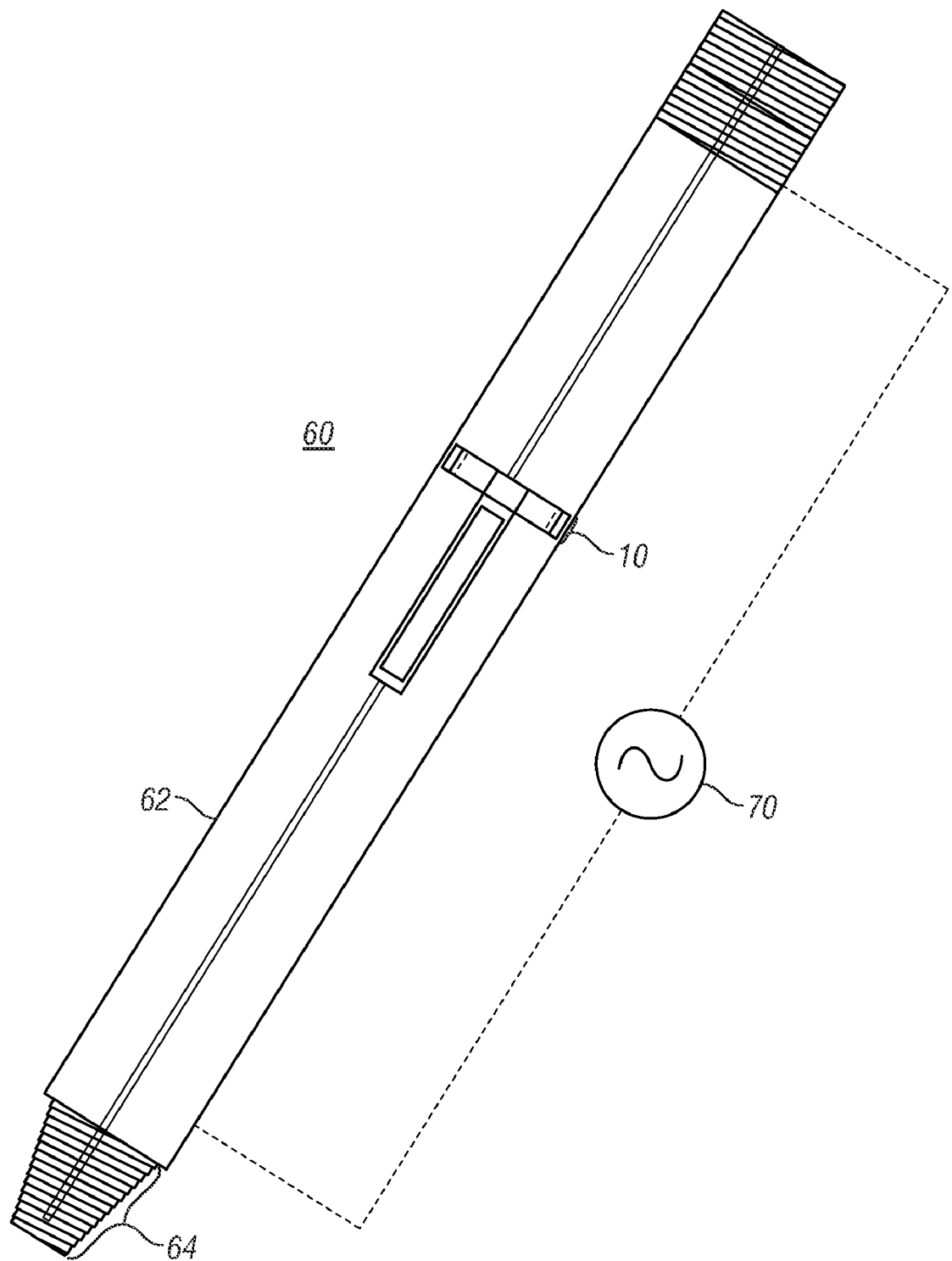
FIG. 3 is a diagram of a sensor tool adapted for use in the surveying-while-rotating system from FIG. 1.

Turning to FIG. 3, there is shown a survey sub 60 within which the sensor arrays 50 and 52 and control circuitry shown in FIGS. 1 and 2 (collectively, the survey tool 10) are carried.

As previously discussed, the present invention is concerned with accounting for cross-axial rotation-induced magnetic fields resulting from rotation of the survey sub 60 while the rotating sensor measurements are being taken. The invention contemplates several alternative but not necessarily mutually exclusive methodologies for so doing.

In one embodiment of the invention, rotation-induced magnetic interference with data sampling is avoided by electrically isolating survey tool 10 from remaining portions of the drillstring, thereby eliminating the current path for induced currents through the drill collar 62 that houses survey tool 10. To accomplish this electrical isolation, at least two possible approaches can be taken. In one embodiment, drill collar 62 is made out of a non-conductive fiber composite material. Suitable materials are well known in the art.

Another option for providing electrical isolation of survey tool 10 is to provide, on each end of drill collar 62, insulating devices such as are disclosed in International Patent Application (PCT) Publication No. WO 03/004826 A1 ("the Fraser et al. application"). The Fraser et al. application is hereby incorporated by reference herein in its entirety. The insulating device disclosed in the Fraser application has the form of an insulative sleeve adapted to conform to the threaded end 64 of drill collar 62. Providing such insulating sleeves at either end (or both ends) of drill collar 62 electrically isolates drill collar 62, such that current induced due to rotation of the drillstring is substantially reduced if not effectively eliminated in the drill collar 62 carrying survey tool 10.

Alternatively, or in addition, cancellation of the induced interference can be carried out analytically, such that the corrections to the rotating sensor data in block 20 can reflect predicted levels of rotation-induced current in the drillstring.

Experimental results have shown that the predominant effect of rotation on magnetometers is to create axial current along the drillstring, which in turn tends to reduce the cross-axial components of the Earth's magnetic field in the reference frame of the survey tool and to rotate the magnetic tool face angle. Thus, in the analytical approach, the first step is to derive a model to predict, to at least a first order of approximation, the axial current induced in the drillstring, such that the resultant cross-axial magnetic effects on the magnetometers can be compensated.

In accordance with one aspect of the invention, the induction model is derived by first calculating, through application of well-established electromagnetic theory principles, the axial electric field that would be induced by immersing the drill string a time varying magnetic field. It is believed that this would be a straightforward exercise for persons of ordinary skill in the art. As would be recognized by persons of ordinary skill in the art, such parameters as the physical dimensions of the drill collar, the permeability and permittivity of the material from which the drill collar is made, and certain other boundary conditions must be specified for the purposes of such computation.

Next, and in accordance with one aspect of the invention, the axial electric field calculation is repeated assuming that the time-varying magnetic field has been rotated 90° with respect to the drill string and its phase has been rotated by 90°. Then, the results of these two calculations are summed to obtain a modeling of the induced electric field resulting from rotation of the drill string. The conductivity of the drillstring is used along with the induced electric field in order to calculate the current. Finally, the interfering magnetic field is calculated from the induced current.

Optionally, through comparison of the modeled and observed interference (for example, at one or more depths), the model may be refined to incorporate a scaling factor. This is particularly important because the electric boundary conditions that determine the magnitude of the induced current are not known in advance.

The predictive model of rotation-induced axial current must be calibrated prior to its use in a particular survey. Preferably, the modeling of the induced interference is calibrated in situ with the specific bottom hole assembly (BHA) to be used in a particular survey, prior to actually conducting the survey. The in situ calibration preferably includes the inductance effects manifested to first order as a phase change whose magnitude is linear with frequency of drillstring rotation.

In one embodiment, the in situ calibration of the predictive rotation-induced current model is carried out by lowering the BHA into the borehole to a known location and rotating it in one or more discrete frequencies. Preferably, at least two discrete frequencies are used; for example, sixty and one-hundred twenty revolutions per minute. The rotation is held at a constant rate for each of the fixed frequencies for a reasonable period of time, for example, at least thirty seconds.

In one embodiment, once the predictive modeling of rotation-induced electric field has been created and calibrated, the model can be used, in block 20 (see FIG. 1) to correct the high sample rate magnetometer data 12. That is, the high sample rate data is adjusted to compensate for the predicted amount of axial current induced in survey tool 60.

In another embodiment, a current generator 70, shown schematically in FIG. 3, may be provided in survey tool 60 to generate an electrical counter-current to cancel the predicted level of rotation-induced current along survey tool 60.

In still another alternative embodiment of the invention, in addition to or instead of establishing a predictive model of rotation-induced current, the drillstring may be provided with measurement tools for measuring the actual amount of induced current being conducted. Current measurements in the region of survey tool 60 are preferred. Such real-time measurements, like the predictive modeling, can be used in various ways. In one embodiment, the data correction process represented by block 20 in FIG. 1 can involve subtraction of the measured current values from the high sample rate data 12. Alternatively, current generator 62 may be provided in the drill string to generate a compensating counter-current to cancel the measured rotation-induced current.

Summarizing, the present invention contemplates determining either a modeled (predicted) rotation-induced current value or an actual (measured) rotation-induced current value and either analytically correcting data values in the high sample rate data stream 12 or generating a counter-current to offset the predicted or actual rotation-induced current in the drillstring.

Figure 4:
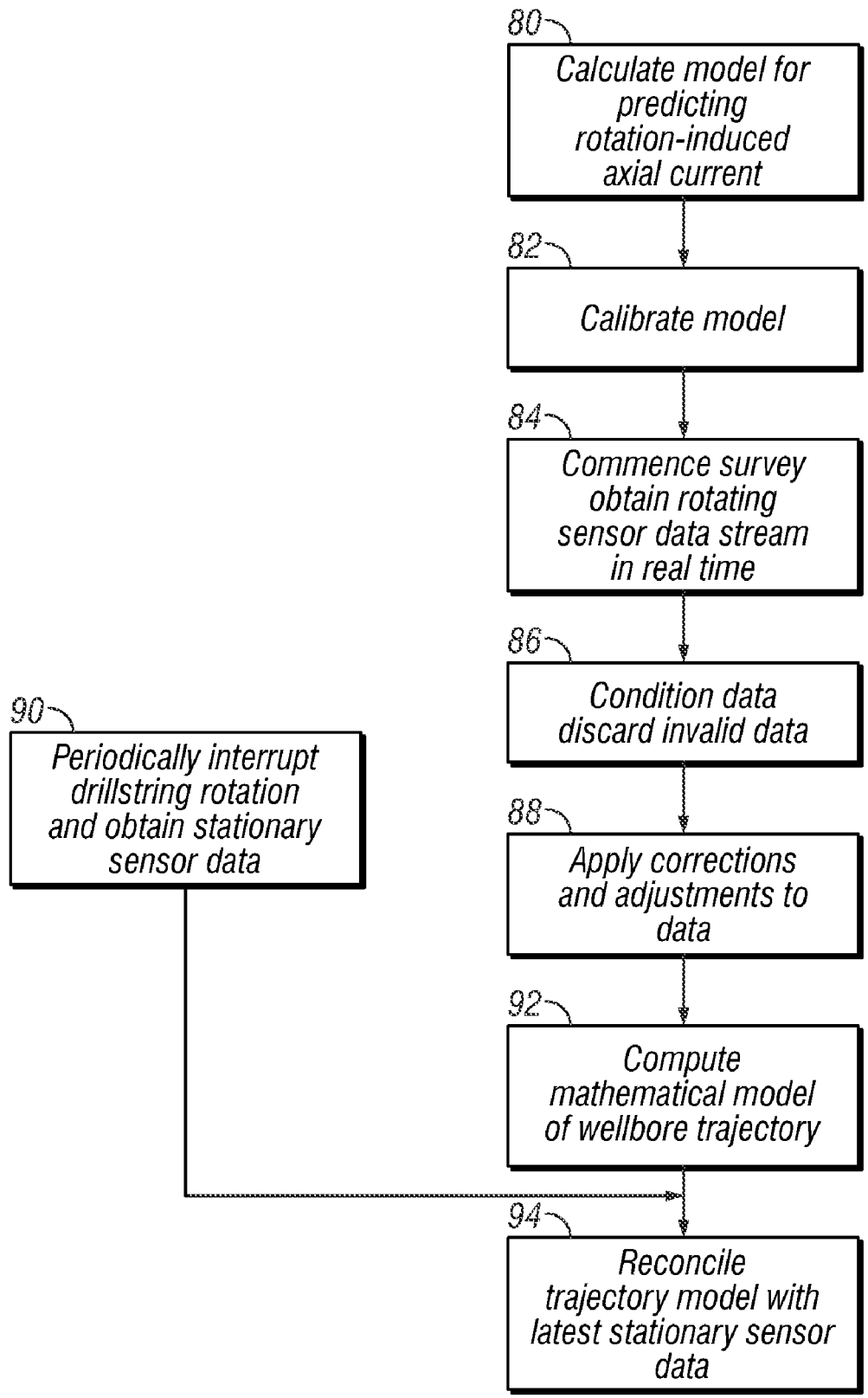
FIG. 4 is a flow diagram illustrating the steps involved in a surveying-while-rotating operation conducted in accordance with the present invention.

FIG. 4 is a flow diagram illustrating a wellbore surveying process in accordance with an exemplary embodiment of the invention. As shown in FIG. 4, the survey process begins with development of a model for predicting rotation-induced axial current due to the rotation of the drillstring within the Earth's magnetic field, represented by block 80 in FIG. 4.

Thereafter, in block 82, the model is calibrated, preferably in situ. As described above, the calibration process preferably involves lowering the BHA to one (or more) discrete depths in the borehole and rotating the drillstring at one or more constant frequencies for sufficient periods of time to obtain reliable data regarding actual performance of the sensors (e.g., 30 seconds at each depth and rotational frequency). If IIFR is used, the operator can skip the calibration step and make use of the data measured immediately following each static survey. Alternatively, if using IIFR, the calibration can be performed in real-time, since the cross-axial magnetic field, which is a function of inclination, azimuth, and local magnetic field vector, is known at any given time.

Having calibrated the model, the borehole survey can commence, as represented by block 84 in FIG. 4. This process involves calculating a detailed survey segment based on the rotating sensor data after correction thereof based on the model. During the course of the survey, a real-time stream of rotating sensor data is generated by sensor array 50 (see FIG. 2). The rotating sensor data is conditioned using conventional processes, such as cross-axial analysis and/or Kalman filtering, as represented by block 86. The conditioning process 86 preferably further includes discarding readily identifiable spurious data points, which can be expected due to drilling noise that can be anticipated to be present in any drilling operation.

Next, in block 88, the conditioned rotating sensor data is corrected and adjusted based upon estimates of scale factor errors and the like. Further, in accordance with one aspect of the invention, this step 88 includes adjustment to compensate for the predicted rotation-induced axial current formulated in blocks 80 and 82.

To make use of an analytical model of the magnetic interference, it is necessary to measure the angular velocity of the survey tool since this is one of the inputs to the model. This can be accomplished as follows. Suppose that the magnetometers are sampled with a constant sampling period of T seconds per sample. Designate successive samples with an integer index i. For a pair of orthogonal magnetometers rotating in a magnetic field, the outputs of the two magnetometers at specific sample times i, $Bx_i$ and $By_i$, are given by $$Bx_i = Boxy_i \cdot \cos(\omega_i \cdot t_i + \phi)$$

$$By_i = Boxy_i \cdot \sin(\omega_i \cdot t_i + \phi)$$

where $Boxy_i$ is the value of the cross-axial magnetic field at time $t_i$ and $\phi$ is a constant determined by the time chosen as the start of sampling.

It is immediately evident that $$Boxy_i = \sqrt{BX_i^2 + By_i^2}$$

Let a finite difference time derivative be taken using N samples, where N is a small integer. Assuming that the angular velocity does not vary rapidly, it is readily shown that to first order $$\frac{Bx_{i+N} - Bx_i}{N \cdot \tau} \approx -\omega_j \cdot Boxy_i \sin(\omega_u \cdot t_i + \phi).$$

In this equation, the symbol $\approx$ designates approximate equality.

where N is a small integer $>0$ $$\frac{By_{i+N} - By_i}{N \cdot \tau} \approx \omega_j \cdot Boxy_i \cos(\omega_u \cdot t_i + \phi),$$

Thus $$\sqrt{\left(\frac{Bx_{i+N} - Bx_i}{N \cdot \tau}\right)^2 + \left(\frac{By_{i+N} - By_i}{N \cdot \tau}\right)^2} \approx \omega_j \cdot Boxy_i$$

Therefore $$\omega_j \approx \frac{\sqrt{Bx_i^2 + By_i^2}}{N \cdot \sqrt{\left(\frac{Bx_{i+N} - Bx_i}{N \cdot \tau}\right)^2 + \left(\frac{By_{i+N} - By_i}{N \cdot \tau}\right)^2}}.$$

The integer N is selected as a tradeoff between sample rate, sensor accuracy, and expected range of rotational frequencies. As a rule of thumb, N should be chosen so that, on average, the expected error in $$Bw_{i+N} - Bw_i$$

where w takes on the values x or y is no worse than three times the expected error in the magnetometer's readings, and preferably no worse than $\sqrt{2}$ times the expected error in the magnetometer's readings.

The variable j is the integer nearest to the middle of i and i+N.

Once the rotating sensor data has been fully conditioned and adjusted, a mathematical model of a segment of the wellbore trajectory can be developed, as represented by block 92.

In parallel with the steps thus far noted with reference to FIG. 4, the survey process further involves the step of periodically interrupting rotation of the drillstring, as represented by block 90 in FIG. 4. In one embodiment, this step occurs approximately every five minutes, although this interval can be longer or shorter as circumstances dictate. At this stage, stationary sensor readings are taken, which is likely to produce more accurate data owing to the absence of any induction effects which may result from rotation of the drillstring.

Whenever new stationary sensor readings are taken in block 90, the system is programmed to reconcile the current trajectory model with the stationary sensor readings, the rationale being that the stationary sensor readings can be expected to be more accurate than the rotating sensor readings. Bringing the trajectory model into conformance with the periodically generated stationary sensor readings can therefore be expected to improve the accuracy of the trajectory model. This reconciliation process is represented by block 94 in FIG. 4.

Those of ordinary skill in the art will recognize that a further advantage of the invention is that by enabling the operator to calculate nearly continuous surveys along the wellbore trajectory, the present invention advantageously allows the operator to continuously calibrate the survey tool 60 in a manner not possible using prior art techniques, which have traditionally involved periodically interrupting the rotation of the tool at discrete downhole locations. Those of ordinary skill in the art will recognize the advantages of being able to calibrate a survey tool's range, scale factor, bias and the like on a real-time basis, since such parameters are subject to drift during a drilling operation.

In the preferred embodiment, the various data processing functions represented in FIG. 1 are performed downhole, by controller 56 shown in FIG. 2, in order to minimize the amount of data required to be telemetered to the surface.

From the foregoing detailed description of specific embodiments of the invention, it should be apparent that methods and apparatuses for wellbore surveying with a rotating sensor package have been disclosed. Although specific embodiments and variations of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested in the present disclosure, may be made to the disclosed embodiments without departing from the spirit and scope of the invention as defined by the appended claims, which follow.

What is claimed is:

1. A method of surveying a well borehole penetrating earth formations, comprising the acts of:
   disposing a sensor tool on a downhole segment of a drillstring inserted into said borehole;
   while said drillstring is rotating in said borehole, obtaining a first set of rotating sensor data from said sensor tool, the first set of data comprising both magnetometer data and accelerometer data, and obtained at a first sample rate;
   obtaining a second set of data from the sensor tool while the sensor tool is stationary, the second set of data comprising magnetometer data and accelerometer data, the second set of data obtained at a second, lower, sample rate; and
   correlating the first and second data sets to estimate the trajectory of said borehole through the formations.

2. The method of claim 1, wherein the magnetometer data of the first set of rotating sensor data comprises data influenced by an ambient magnetic field.

3. The method of claim 1, wherein the magnetometer data of the first set of rotating sensor data comprises data influenced by a magnetic field resulting at least in part from rotation of the drillstring.

4. The method of claim 1, wherein the act of estimating the trajectory of the borehole comprises calculating a trajectory model of the borehole.

5. The method of claim 1, wherein the magnetometer data is obtained through use of a tri-axis magnetometer.

6. A method of surveying a well borehole, comprising the acts of:
- disposing a sensor tool on a drillstring inserted into said borehole;
- while said drillstring is rotating in said borehole, obtaining a first set of sensor data from at least one inclinometer and at least one magnetometer, the data including data influenced by magnetic fields comprising at least an ambient magnetic field and a rotation-induced magnetic field;
- correcting the first set of sensor data based upon modeling of the rotation-induced magnetic field, to provide a corrected set of sensor data;
- modeling the borehole path in reference to the corrected set of sensor data;
- while the drillstring is not rotating in the borehole, obtaining a second set of data, the second set of data obtained from at least one inclinometer and at least one magnetometer; and adjusting the borehole path model in reference to the second set of data.

7. The method of claim 6, wherein the first and second sets of sensor data are obtained from the same inclinometer and the same magnetometer.

8. The method of claim 6, wherein the modeling of the rotation-induced magnetic field comprises a model of rotation-induced magnetic field current induced in said drillstring due to rotation of said drillstring in the Earth's magnetic field, said modeling providing a predicted rotation-induced current; and wherein the method further comprises the act of applying a countercurrent to said sensor tool to cancel the predicted rotation-induced current.

9. A method of surveying a well borehole, comprising the acts of:
- disposing a sensor tool on a downhole segment of a drillstring inserted into said borehole;
- determining a model that comprises the axial current that would be induced in a drillstring immersed in a time-varying magnetic field as a result of rotation of the drillstring in a borehole;
- obtaining a set of rotating sensor data from said sensor tool while the drillstring is rotating in said borehole; and
- modeling the borehole trajectory in reference to both the modeled the induced axial current and the rotating sensor data.

10. The method of claim 9, wherein the act of modeling the borehole trajectory comprises applying corrections to the set of rotating sensor data, wherein the corrections are based at least in part on the modeled induced axial current.

11. The method of claim 9, wherein the act of determining a model of the induced axial current comprises calibrating the model through taking at least one stationary measurement of said drillstring within the borehole.

12. The method of claim 9, wherein the act of determining a model of the induced axial current comprises calibrating the model through taking at least one stationary measurement of said drillstring within the borehole before obtaining the set of rotating sensor data.

13. The method of claim 9, wherein the act of determining a model of the induced axial current comprises calibrating the model through use of measurements obtained while rotating the drillstring in the borehole at one or more known frequencies.

14. The method of claim 9, wherein the act of determining a model comprising current that would be induced in a drillstring comprises determining the model based on axial current that would be induced in the drillstring in the absence of rotation of the drillstring.

* * * * *